US012643825B2

(12) United States Patent
Iguchi et al.

(10) Patent No.: US 12,643,825 B2
(45) Date of Patent: *Jun. 2, 2026

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Takeshi Shouji, Tokyo (JP); Kenichiro Masuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 703 days.

This patent is subject to a terminal disclaimer.

(21) Appl. No.: 18/070,860

(22) Filed: Nov. 29, 2022

(65) Prior Publication Data

US 2023/0303451 A1      Sep. 28, 2023

(30) Foreign Application Priority Data

Jan. 26, 2022     (JP) ................................. 2022-010239

(51) Int. Cl.
| | |
|---|---|
| *C04B 35/49* | (2006.01) |
| *H01G 4/12* | (2006.01) |
| *H01G 4/30* | (2006.01) |

(52) U.S. Cl.
CPC ........... *C04B 35/49* (2013.01); *H01G 4/1209* (2013.01); *C04B 2235/3217* (2013.01); *C04B 2235/3249* (2013.01); *C04B 2235/3418* (2013.01); *C04B 2235/3454* (2013.01); *C04B* *2235/442* (2013.01); *C04B 2235/768* (2013.01); *H01G 4/30* (2013.01)

(58) Field of Classification Search
CPC ............ C04B 35/49; C04B 2235/3454; C04B 2235/768; C04B 35/488; C04B 2235/3208; C04B 2235/3213; C04B 2235/3262; C04B 2235/3427; H01G 4/1209; H01G 4/30; H01G 4/1227
See application file for complete search history.

(56) References Cited

U.S. PATENT DOCUMENTS

| | | | |
|---|---|---|---|
| 12,322,553 B2 * | 6/2025 | Sueda ..................... | C04B 35/49 |
| 2003/0186802 A1 | 10/2003 | Watanabe et al. | |
| 2021/0183573 A1 | 6/2021 | Iguchi | |
| 2022/0254570 A1 * | 8/2022 | Ariizumi ............. | C04B 35/4682 |

FOREIGN PATENT DOCUMENTS

| | | | |
|---|---|---|---|
| CN | 112992538 A | | 6/2021 |
| JP | 2004217509 A | * | 8/2004 |
| WO | 02/00568 A1 | | 1/2002 |

OTHER PUBLICATIONS

JP2004217509A—machine translation (Year: 2004).*

* cited by examiner

*Primary Examiner* — Cameron K Miller
(74) *Attorney, Agent, or Firm* — Oliff PLC

(57)      ABSTRACT

A dielectric composition includes dielectric particles and segregation phases. The dielectric particles each include Ca and/or Sr. The segregation phases each include Mn, Si, O, and at least one selected from Ca and Sr.

18 Claims, 2 Drawing Sheets

DIELECTRIC COMPOSITION AND MULTILAYER CERAMIC ELECTRONIC DEVICE

TECHNICAL FIELD

Figure 1:
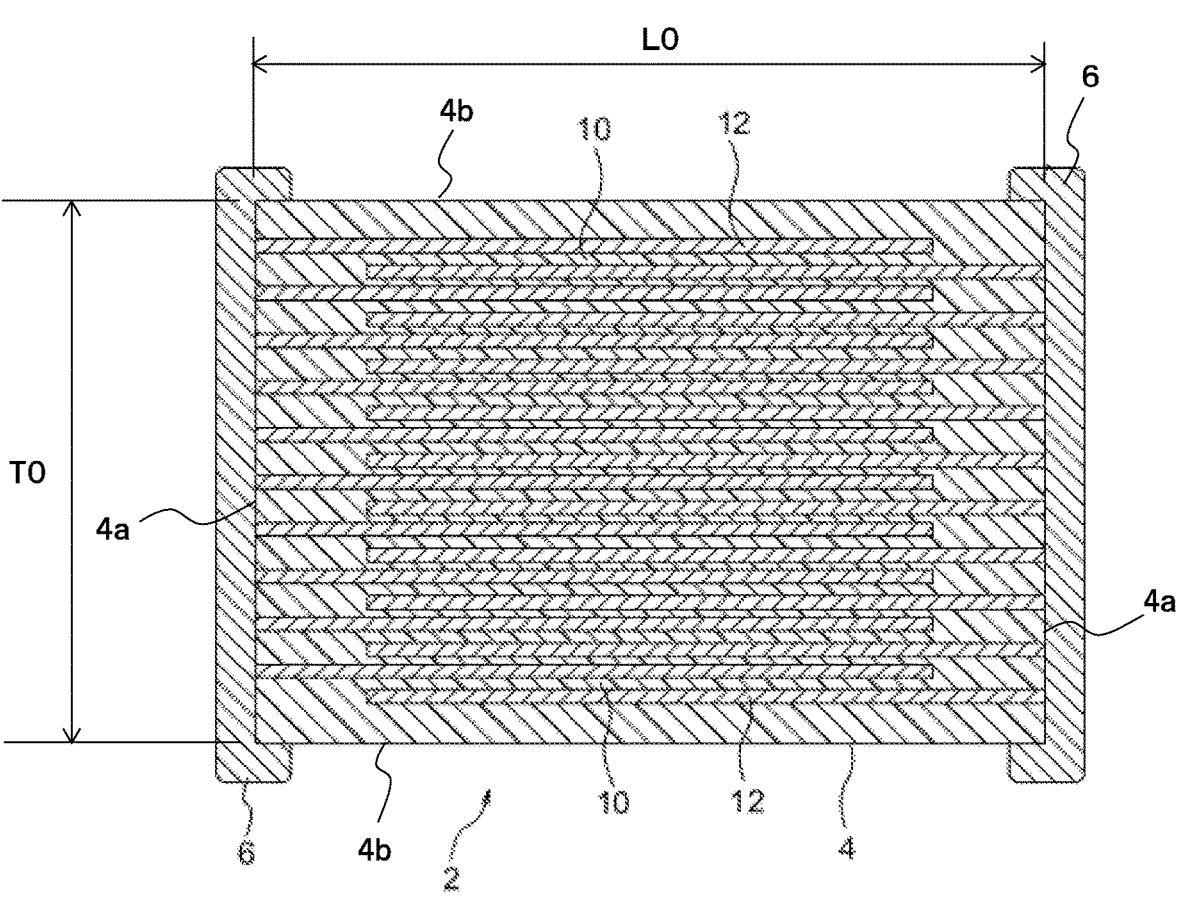
Figure 1:
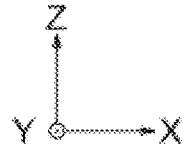

The present invention relates to a dielectric composition and a multilayer ceramic electronic device including the dielectric composition.

BACKGROUND

As shown in Patent Document 1, a multilayer ceramic electronic device including ceramic layers composed of a dielectric composition is known. In this multilayer ceramic electronic device, cracking may occur inside an element body containing the dielectric composition, and corners of the element body may be chipped. Factors that cause cracking and chipping include bending of a mounting substrate, difference in linear expansion coefficient between ceramic layers and internal electrode layers, impact and stress applied to the element body from the outside, or the like. If cracking or chipping occurs in the element body, the characteristics of the multilayer ceramic electronic device deteriorate. Therefore, it is required to improve the fracture toughness strength of the dielectric composition and prevent the occurrence of cracking and chipping.

Patent Document 1: WO0200568 (A1)

SUMMARY

The present invention has been achieved under such circumstances. It is an object of the present invention to provide a dielectric composition having less cracking and chipping and a multilayer ceramic electronic device including the dielectric composition.

To achieve the above object, a dielectric composition according to the present invention comprises:

dielectric particles each including Ca and/or Sr;

segregation phases each including Mn, Si, O, and at least one selected from Ca and Sr.

As a result of intensive studies, the present inventors have found that the dielectric composition having the above-mentioned features can exhibit high fracture toughness strength and prevent the occurrence of cracking and chipping.

Preferably, each of the dielectric particles includes a perovskite compound represented by $ABO_3$, an A-site of the perovskite compound includes Ca and/or Sr, a B-site of the perovskite compound includes Zr and/or Ti, a total molar ratio of Ca and Sr to 1 mol of the A-site is 0.8 or more, and a molar ratio of Zr to 1 mol of the B-site is 0.8 or more.

In the segregation phases and the dielectric particles, a content rate of a predetermined element is preferably controlled in a predetermined range. In the following description for content rate, Ca, Sr, Zr, Mn, Si, Al, Ti, and Hf are regarded as specific elements. Moreover, a content rate of a predetermined element in the segregation phases is shown provided that a total content of the specific elements in the segregation phases is 100 mol %. Moreover, a content rate of a predetermined element in the dielectric particles is shown provided that a total content of the specific elements in the dielectric particles is 100 mol %.

Preferably, a content rate of Mn in the segregation phases is 5 mol % or more, and a content rate of Mn in the dielectric particles is 2 mol % or less.

When the content rates of Mn in each of the segregation phases and the dielectric particles are controlled in the above-mentioned ranges, cracking and chipping can be prevented more effectively, and a high dielectric breakdown voltage can be obtained.

Preferably, a total content rate of Ca and Sr in the segregation phases is 60 mol % or more.

Preferably, a content rate of Si in the segregation phases is 20 mol % or more.

Preferably, a content rate of the segregation phases is 0.05 pieces/$\mu m^2$ or more and 0.5 pieces/$\mu m^2$ or less. When the content rate of the segregation phases is controlled in the above-mentioned range, cracking and chipping can be prevented more effectively, and a high dielectric breakdown voltage can be obtained.

Preferably, an average particle size of the segregation phases is 0.05 $\mu m$ or more and 1.00 $\mu m$ or less. When the average particle size of the segregation phases is controlled in the above-mentioned range, cracking and chipping can be prevented more effectively, and a high dielectric breakdown voltage can be obtained.

A multilayer ceramic electronic device including the above-mentioned dielectric composition exhibits a high durability for external stress and impact. That is, the multilayer ceramic electronic device of the present invention can sufficiently prevent defects, such as cracking and chipping, occurring in the element body.

BRIEF DESCRIPTION OF THE DRAWING(S)

Figure 2:
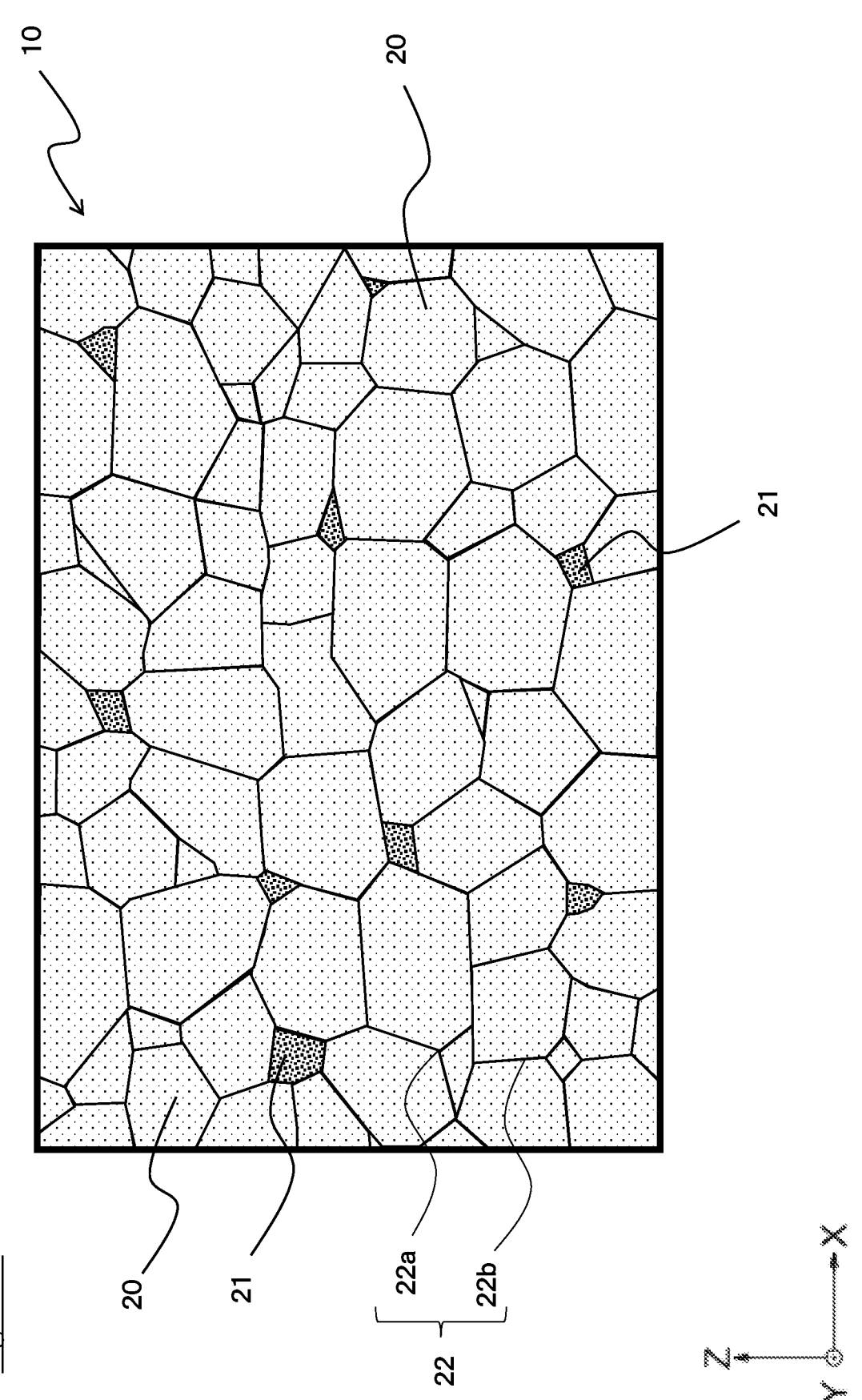

FIG. 1 is a schematic view illustrating a cross section of a multilayer ceramic capacitor according to an embodiment of the present invention; and FIG. 2 is an enlarged cross-sectional view of ceramic layers 10 shown in FIG. 1.

DETAILED DESCRIPTION

In the present embodiment, a multilayer ceramic capacitor 2 shown in FIG. 1 is described as an example of a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4 mm to 5.7 mm in the X-axis direction, a width W0 of 0.2 mm to 5.0 mm in the Y-axis direction, and a height TO of 0.2 mm to 3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The ceramic layers 10 are made of a dielectric composition mentioned below. The average thickness (interlayer thickness) per layer of the ceramic layers 10 is not limited and can be, for example, 100 μm or less (preferably, 30 μm or less). The lamination number of ceramic layers 10 is determined based on desired characteristics and is not limited. For example, the lamination number of ceramic layers 10 can be 20 or more, preferably 50 or more.

Meanwhile, the internal electrode layers 12 are laminated between the ceramic layers 10 and the lamination number of internal electrode layers 12 is determined based on the lamination number of ceramic layers 10. The average thickness per layer of the internal electrode layers 12 is not limited and can be, for example, 3.0 μm or less. The average thickness of the ceramic layers 10 and the average thickness of the internal electrode layers 12 are calculated by observing a cross section as shown in FIG. 1 using a metallurgical microscope and measuring the thickness of each layer (10, 12) at five points or more.

The internal electrode layers 12 are laminated so that their ends on one side are alternately exposed to two end surfaces 4a of the element body 4 facing each other in the X-axis direction. Then, the pair of external electrodes 6 is formed on the end surfaces 4a of the element body 4 and electrically connected to the exposed ends of the internal electrode layers 12. Since the internal electrode layers 12 and the external electrodes 6 are formed in such a manner, a capacitor circuit is formed by the external electrodes 6 and the internal electrode layers 12. That is, the ceramic layers 10 existing in the capacitance region are sandwiched by the internal electrode layers 12 having different polarities, and voltage can be applied to the ceramic layers 10.

The internal electrode layers 12 are made of a conductive material and preferably include Ni as a main component. Specifically, preferably, the conductive material of the internal electrode layers 12 is pure Ni or a Ni based alloy containing Ni by 85 wt % or more. The Ni based alloy may include one or more elements selected from Mn, Cu, Cr, etc. In addition to the conductive material, as an inhibitor, the internal electrode layers 12 may contain particles of a perovskite compound having the same composition as the main component of the ceramic layers 10. In addition, the internal electrode layers 12 may contain a trace amount (e.g., about 0.1 mass % or less) of non-metal elements, such as S and P, and may contain voids. When the internal electrode layers 12 contain an inhibitor, voids, or the like, the internal electrode layers 12 may have disconnected parts where an electrode (conductive material) is not present.

The pair of external electrodes 6 can include a baked electrode layer, a resin electrode layer, a plating electrode layer, or the like and may be composed of a single electrode layer or a plurality of laminated electrode layers. For example, the external electrode 6 can have a triple-layer structure of a baked electrode layer containing Cu—a Ni plating layer—a Sn plating layer (laminated in this order). When the external electrode 6 having this triple-layer structure is formed, the Sn plating layer is located on the outermost surface of the external electrode 6, and the solder wettability of the external electrode 6 is thus favorable.

As shown in FIG. 1, each of the external electrodes 6 integrally includes an end surface part formed on the end surface 4a and extension parts formed at an end in the X-axis direction on the four side surfaces 4b of the element body 4. That is, each of the external electrodes 6 is formed so as to range from the end surface 4a to the side surfaces 4b of the element body 4. The external electrodes 6 are insulated so as not to contact with each other in the X-axis direction.

Note that, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

Next, a dielectric composition of the ceramic layers 10 is explained in detail.

The dielectric composition of the ceramic layers 10 includes a main component containing Ca and/or Sr, and the main component is preferably a perovskite compound represented by a general formula of $ABO_3$. Here, the main component of the ceramic layers 10 (the main component of the dielectric composition) means a component occupying 80 mol % or more of the ceramic layers 10. The perovskite compound includes barium titanate, calcium titanate, strontium titanate, calcium zirconate, strontium zirconate, calcium strontium zirconate, or the like.

In the present embodiment, preferably, the perovskite compound (main component) satisfies a composition formula of $(Ca_{(1-\alpha-\beta)}Sr_\alpha Ba_\beta)_m(Zr_{(1-\gamma-\delta)}Ti_\gamma Hf_\delta)O_3$. In the composition formula, each of $\alpha$, $\beta$, $\gamma$, $\delta$, and m indicates an elemental ratio.

For example, m indicates an elemental ratio of the A-site to the B-site and can be in the range of 1.0 to 1.1.

$\alpha$ indicates an elemental ratio of Sr in the A-site, and $\beta$ indicates an elemental ratio of Ba in the A-site. In the present embodiment, preferably, the A-site is mainly composed of Ca and/or Sr. Specifically, the total ratio $(1-\beta)$ of Ca and Sr in the A-site is preferably 0.8 or more. The elemental ratio $(1-\alpha-\beta)$ of Ca in the A-site is preferably 0.5 or more and 1.0 or less and is more preferably 0.6 or more and 1.0 or less. $\alpha$ is preferably 0 or more and 0.5 or less and is more preferably 0 or more and 0.4 or less. $\beta$ is preferably 0 or more and 0.2 or less and is more preferably 0.1 or less.

$\gamma$ indicates an elemental ratio of Ti in the B-site, and $\delta$ indicates an elemental ratio of Hf in the B-site. In the present embodiment, preferably, the B-site is mainly composed of Zr. Specifically, the elemental ratio $(1-\gamma-\delta)$ of Zr in the B-site is preferably 0.8 or more and 1.0 or less and is more preferably 0.9 or more and 1.0 or less. $\gamma$ is preferably 0 or more and 0.2 or less and is more preferably 0.1 or less. Hf is normally an unavoidable impurity. Preferably, $\delta$ is 0.03 or less.

The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, compounds containing rare earth elements, Si compounds, Li compounds, B compounds, V compounds, Al compounds, and Ca compounds. There is no limit to the type, combination, or addition amount of the sub-components.

The composition of the ceramic layers 10 may be analyzed by inductively coupled plasma emission spectroscopy (ICP), laser ablation ICP mass analysis (LA-ICP-MS), fluorescent X-ray analysis (XRF), energy dispersive X-ray analysis (EDX), electron beam microanalyzer (EPMA) equipped with wavelength dispersive X-ray spectroscope (WDS), or the like.

The ceramic layers 10 containing the above-mentioned components have an internal texture as shown in FIG. 2 and include dielectric particles 20 (main phases), segregation phases 21 having predetermined characteristics, and grain boundaries 22 located between the dielectric particles 20. The grain boundaries 22 include multiple junctions 22a located among three or more dielectric particles 20 and two-particle grain boundaries 22b located between two dielectric particles 20.

The dielectric particles 20 are composed of the main component (perovskite compound) of the ceramic layers 10 mentioned above. In addition to the main component, when the ceramic layers 10 include sub-components, the sub-components may be solid-soluted in the dielectric particles 20. The dielectric particles 20 may have a core-shell structure by solid solution of the sub-components. The dielectric particles 20 can have an average particle size of 5 μm or less and preferably have an average particle size of 0.10 μm to 2.00 μm.

An average particle size of the dielectric particles 20 can be measured by observing a cross section of the ceramic layers 10 as shown in FIG. 2 using a scanning transmission electron microscope (STEM), a scanning electron microscope (SEM), or the like and performing an image analysis of the obtained cross-sectional photograph. For example, an average particle size of the dielectric particles 20 is calculated by measuring circle equivalent diameters of at least five or more dielectric particles 20.

As shown in FIG. 2, the ceramic layers 10 of the present embodiment include segregation phases 21. The segregation phases 21 include Mn, Si, O (oxygen), and at least one selected from Ca and Sr. That is, the segregation phases 21 are phases including a ternary composite oxide (Ca—Mn—Si—O or Sr—Mn—Si—O) or a quaternary composite oxide (Ca—Sr—Mn—Si—O). In addition to the above-mentioned elements, the segregation phases 21 may include Ba, Zr, Ti, Hf, Al, sub-component elements, and the like. Since the dielectric composition includes the segregation phases 21 containing the predetermined elements, the fracture toughness strength of the dielectric composition is improved, and the occurrence of defects, such as cracking and chipping, in the ceramic layers 10 can be prevented. Preferably, the segregation phases 21 are present in the multiple junctions 22a rather than in the two-particle grain boundaries 22b.

The segregation phases 21 can be determined by a mapping analysis using STEM-EDS, STEM-WDS, SEM-EDX, or SEM-WDS. For example, a mapping analysis is performed in a cross section of the element body 4 as shown in FIG. 2 to obtain a mapping image of each element constituting the dielectric composition. In the mapping image, it is possible to determine a region where the abundance ratio of the predetermined elements is high, that is, a region where the predetermined elements are segregated, based on the shade of color tone. In particular, in the segregation phases 21, the concentration(s) of Ca and/or Sr, the concentration of Mn, and the concentration of Si are higher than those in the dielectric particles 20. Thus, the mapping images of Ca, Sr, Mn, and Si are overlapped to determine regions where Ca and/or Sr, Mn, and Si are overlapped and segregated, and these regions are regarded as the segregation phases 21 in the present embodiment.

In order to more accurately determine whether or not Ca and Sr are contained in the segregation phases 21, preferably, a point analysis is performed together with the above-mentioned mapping analysis. That is, a point analysis using STEM-EDS, STEM-WDS, SEM-EDX, or SEM-WDS is performed in the specific regions determined as the segregation phases 21 by the mapping analysis. Ca and Sr are elements constituting the main component of the ceramic layers 10 and the point analysis of the specific regions are affected by the dielectric particles 20 existing around the specific regions. Thus, when whether or not Ca and Sr are contained in the segregation phases 21 by EDX or WDS is determined, a molar ratio (Ca/(Zr+Ti)) of Ca to a total of Zr and Ti and a molar ratio (Sr/(Zr+Ti)) of Sr to a total of Zr and Ti are measured.

Specifically, Ca/(Zr+Ti) in the specific regions and Ca/(Zr+Ti) in the dielectric particles 20 are measured and compared. When Ca/(Zr+Ti) in the specific regions is higher than that in the dielectric particles 20, it can be determined that the specific regions contain Ca and are the segregation phases 21 in the present embodiment. Likewise, Sr/(Zr+Ti) in the specific regions and Sr/(Zr+Ti) in the dielectric particles 20 are measured and compared. When Sr/(Zr+Ti) in the specific regions is higher than that in the dielectric particles 20, it can be determined that the specific regions contain Sr and are the segregation phases 21 in the present embodiment.

In the segregation phases 21, the content rate of constituent elements is preferably controlled within a predetermined range. In the following description of the "content rate", Ca, Sr, Zr, Mn, Si, Al, Ti, and Hf are specific elements, and a content rate of a predetermined element in the segregation phases 21 is indicated provided that the total content of the specific elements in the segregation phases 21 is 100 mol %. Likewise, a content rate of a predetermined element in the dielectric particles 20 is indicated provided that the total content of the specific elements in the dielectric particles 20 is 100 mol %.

First, regarding Mn (a constituent element of the segregation phases 21), the content rate of Mn in the segregation phases 21 is preferably 5 mol % or more, and the content rate of Mn in the dielectric particles 20 is preferably 2 mol % or less. When the content rate of Mn in each of the segregation phases 21 and the dielectric particles 20 is controlled within the above-mentioned range, cracking and chipping can be more effectively prevented, and a high dielectric breakdown voltage can be obtained. The content rate of Mn in the segregation phases 21 is more preferably 7 mol % or more, and its upper limit is not limited. For example, the content rate of Mn in the segregation phases 21 can be 15 mol % or less and is preferably 10 mol % or less. Moreover, the content rate of Mn in the dielectric particles 20 is more preferably 1 mol % or less and is still more preferably 0.5 mol % or less.

The total content rate of Ca and Sr in the segregation phases 21 is preferably 60 mol % or more. When this requirement is satisfied, cracking and chipping can be more effectively prevented with a high dielectric breakdown voltage. The upper limit of the total content rate of Ca and Sr in the segregation phases 21 is not limited and is preferably 70 mol % or less, for example. When both of Ca and Sr are contained in the segregation phases 21, the Ca/Sr ratio in the segregation phases 21 is preferably 1.5 or more and is more preferably 1.5 or more and 8 or less.

The content rate of Si in the segregation phases 21 is preferably 20 mol % or more and is more preferably 22 mol % or more. When this requirement is satisfied, cracking and chipping can be more effectively prevented with a high dielectric breakdown voltage. The upper limit of the content rate of Si in the segregation phases 21 is not limited and is, for example, preferably 35 mol % or less, more preferably 31 mol % or less.

The detailed composition of the segregation phases 21 is not limited, but the crystal structure of the segregation phases 21 is preferably an orthorhombic system. Composite oxides having such a crystal structure include, for example, $(Ca, Sr,Mn)_2SiO_4$. In this composite oxide, Ca, Sr, and Mn share the same site.

The average particle size of the segregation phases 21 is preferably 0.05 µm or more and 1.00 µm or less and is more preferably 0.08 µm or more and 0.85 µm or less. Preferably, the average particle size of the segregation phases 21 is within the range of 0.05 times to 0.5 times the average particle size of the dielectric particles 20. The average particle size of the segregation phases 21 is calculated by determining at least five or more segregation phases 21 with EDX or WDS and thereafter measuring circle equivalent diameters of the determined segregation phases 21 by image analysis.

In the present embodiment, the content rate of the segregation phases 21 in the dielectric composition (i.e., ceramic layers 10) is defined by the number of segregation phases 21 contained in a unit cross-sectional area of the dielectric composition (unit: pieces/$µm^2$). The content rate of the segregation phases 21 can be 0.01 pieces/$µm^2$ or more and is preferably 0.05 pieces/$µm^2$ or more and 0.50 pieces/$µm^2$ or less. The content rate of the segregation phases 21 is calculated by observing a cross section of the ceramic layers 10 as shown in FIG. 2 in a plurality of visual fields with STEM, SEM, or the like and counting the number of segregation phases 21 existing in the cross section of at least 1000 $µm^2$ in total.

When the average particle size and/or the content rate of the segregation phases 21 is in the above-mentioned favorable range, cracking and chipping can be more effectively prevented with a high dielectric breakdown voltage.

As described above, the ceramic layers 10 (dielectric composition) of the present embodiment include the predetermined segregation phases 21, and the fracture toughness strength of the element body 4 can be improved by the segregation phases 21. In addition to the above-mentioned segregation phases 21, the ceramic layers 10 may include other segregation phases, voids, or the like. Other segregation phases include segregation phases containing Zr and segregation phases containing sub-component elements, such as Mg, Al, and rare earth elements. The grain boundaries 22 existing between the dielectric particles 20 are composed of the constituent elements of the main component and/or the sub-component elements, and other segregation phases as described above may exist in the grain boundaries 22.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is produced by using a powder of a perovskite compound, which is a main component of a dielectric composition (hereinafter, referred to as a main component powder), and a segregation powder to be the segregation phases 21 after firing. The main component powder can be produced by solid-phase method, hydrothermal synthesis method, sol-gel method, or the like. In solid-phase method, for example, the main component powder is obtained by uniformly mixing starting raw materials of $CaCO_3$ powder, $SrCO_3$ powder, $ZrO_2$ powder, $TiO_2$ powder, and the like in a wet mixing manner and thereafter performing a calcining treatment. At this time, the calcined main component powder may be appropriately pulverized, classified, or the like.

The segregation powder is obtained by mixing a compound powder containing Ca (e.g., $CaCO_3$ powder) and/or a compound powder containing Sr (e.g., $SrCO_3$ powder), a compound powder containing Mn (e.g., $MnCO_3$ powder), and a compound powder containing Si (e.g., $SiO_2$ powder) at a predetermined proportion and calcining the mixture. The composition of the segregation phases 21 can be controlled by the blending proportion of the compound powders as starting raw materials. In the production of the segregation powder, it is preferable to control the particle sizes of the segregation phases 21 by appropriately performing a pulverization treatment or the like. As the compound powders, oxide powders, carbonate powders, nitrate powders, sulfate powders, etc. can be used, and compound powders to be oxides after firing are used.

The dielectric paste is obtained by adding the main component powder and the segregation powder to an organic vehicle and kneading them. Here, the organic vehicle is a binder dissolved in an organic solvent. The binder to be used is not limited and is appropriately selected from various binders of polyvinyl butyral, acrylic, ethyl cellulose, and the like. The organic solvent to be used is not limited and is appropriately selected from various organic solvents of methyl ethyl ketone, methanol, ethanol, acetone, toluene, terpineol, butyl carbitol, and the like.

The above-mentioned dielectric paste is an organic paint, but the dielectric paste may be a water based paint obtained by kneading a mixed powder and a water based vehicle. In this case, the water based vehicle is produced by dissolving a water-soluble binder, a dispersant, and the like in water. The water-soluble binder to be used is not limited and can be, for example, polyvinyl alcohol, water-soluble acrylic resin, water-soluble polyvinyl butyral resin, or the like. The content rate of the segregation phases 21 can be controlled by adjusting the blending ratio of the segregation powder in the dielectric paste. If necessary, the dielectric paste may contain additives selected from various dispersants, plasticizers, dielectrics, sub-component compounds, and glass frits.

Meanwhile, an internal-electrode paste is produced by kneading a conductive material, such as pure Ni powder and Ni alloy powder, or a compound to be the above-mentioned Ni or Ni alloys after main firing, such as various oxides, organometallic compounds, and resinate, along with the organic vehicle as mentioned above. At this time, as an inhibitor, the main component powder contained in the dielectric paste may be added to the internal-electrode paste. The inhibitor exhibits a reduction effect on the sintering of the conductive powder in the firing step.

Next, the dielectric paste is turned into sheets by, for example, a doctor blade method to obtain ceramic green sheets. Then, the internal-electrode paste is applied onto the ceramic green sheets in a predetermined pattern by various printing methods, such as screen printing, or a transfer method. Moreover, the green sheets with the internal electrode patterns are laminated and thereafter pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned process is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, the green chips are put into a barrel container together with a medium and a polishing liquid, and a rotational movement or vibration is applied to the barrel container. Due to this barrel polishing, unnecessary parts, such as burrs, generated during the cutting are polished, and the corners of the green chips become rounded (corner R). The green chips after the barrel polishing are washed with a cleaning solution, such as water, and dried. This barrel polishing may be performed after firing the green chips.

Next, the green chips obtained above are subjected to a binder removal treatment and a firing treatment to obtain the element body 4.

The conditions for the binder removal treatment are not limited and are appropriately determined based on the main component composition of the ceramic layers 10 and the main component composition of the internal electrode layers 12. For example, the heating rate is preferably 5-300° C./hour, the holding temperature is preferably 180-400° C., and the temperature holding time is preferably 0.5-24 hours. The binder removal atmosphere may be the air or a reducing atmosphere.

The conditions for the firing treatment are not limited and are appropriately determined according to the main component composition of the ceramic layers 10 and the main component composition of the internal electrode layers 12. For example, the holding temperature during firing is preferably 1200 to 1350° C. and is more preferably 1220 to 1300° C., and the holding time is preferably 0.5 to 8 hours and is more preferably 1 to 3 hours. Preferably, the firing atmosphere is a reducing atmosphere. As the atmosphere gas, for example, a mixed gas of $N_2$ and $H_2$ can be humidified and used. When the internal electrode layers 12 are composed of a base metal, such as Ni and a Ni alloy, the oxygen partial pressure in the firing atmosphere is preferably $1.0 \times 10^{-14}$ to $1.0 \times 10^{-10}$ MPa.

If necessary, annealing may be performed after the firing treatment. Annealing is a treatment for reoxidizing the ceramic layers 10 and is preferably performed when the firing treatment is performed in a reducing atmosphere. The conditions for the annealing treatment are not limited and are also appropriately determined according to the main component composition of the ceramic layers 10 or the like. For example, the holding temperature is preferably 650 to 1150° C., the temperature holding time is preferably 0 to 20 hours, and the heating rate and the cooling rate are preferably 50 to 500° C./hour. Preferably, a dry $N_2$ gas, a humidified $N_2$ gas, or the like is used as the atmosphere gas. Annealing may be performed multiple times.

In the binder removal treatment, the firing treatment, and the annealing treatment, for example, a wetter or the like is used so as to humidify the $N_2$ gas, the mixed gas, etc. In this case, the water temperature is preferably about 5 to 75° C. The binder removal treatment, the firing treatment, and the annealing treatment may be performed continuously or independently.

Preferably, the oxygen partial pressure in the firing atmosphere is $1.0 \times 10^{-12}$ MPa or less so that the content rate of Mn in the dielectric particles 20 is as low as 2 mol % or less. Instead, more preferably, the oxygen partial pressure in the firing atmosphere is $1.0 \times 10^{-12}$ MPa or less, and annealing is performed twice or more.

In each of the above-mentioned heat treatments (binder removal treatment, firing treatment, and annealing treatment (reoxidation treatment)), the green chips are placed on a setter (plate-shaped refractory) and heated. After the heat treatments, the fired element body 4 is dropped from the setter and collected. In the present embodiment, the ceramic layers 10 are composed of a dielectric composition including the segregation phases 21, and the element body 4 is less likely to have crack and chipping even if an impact, such as dropping, is applied. That is, crack and chipping can be prevented even when the fired element body 4 is collected from the setter, and the defect rate in the manufacturing process can be reduced.

Next, a pair of external electrodes 6 is formed on the outer surface of the element body 4 obtained above. The external electrodes 6 are formed by any method. For example, when baked electrodes are formed as the external electrodes 6, a conductive paste containing glass frits is applied to the end surfaces of the element body 4 by a dip method, and the element body 4 is thereafter heated at a predetermined temperature. When resin electrodes are formed as the external electrodes 6, a conductive paste containing a thermosetting resin is applied to the end surfaces of the element body 4, and the element body 4 is thereafter heated at a temperature at which the thermosetting resin is cured. After the baked electrodes or the resin electrodes are formed in the above-mentioned manner, sputtering, vapor deposition, electrolytic plating, electroless plating, or the like may be performed so as to form the external electrodes 6 having a multilayer structure.

After the above-mentioned process, the multilayer ceramic capacitor 2 including the external electrodes 6 is obtained.

Summary of Embodiment

The multilayer ceramic capacitor 2 according to the present embodiment includes the element body 4 formed by alternately laminating the ceramic layers 10 composed of a predetermined dielectric composition and the internal electrode layers 12. Then, the dielectric composition of the ceramic layers 10 includes: the dielectric particles 20 each containing Ca and/or Sr; and the segregation phases 21 each containing Mn, Si, O, and at least one selected from Ca and Sr.

Since the dielectric composition of the ceramic layers 10 has the above-mentioned characteristics, the fracture toughness strength is improved. The reason why the fracture toughness strength is improved is not necessarily clear, but is considered due to the improvement in joint strength among the dielectric particles by the segregation phases 21 containing predetermined elements. Even if a crack starting point is generated inside the dielectric composition, it is considered that the crack growth can be prevented by the segregation phases 21. In the multilayer ceramic capacitor 2 of the present embodiment, since the ceramic layers 10 are composed of a dielectric composition having a high fracture toughness strength, the element body 4 can be sufficiently prevented from having cracking and chipping. Moreover, the multilayer ceramic capacitor 2 exhibits a high durability for external stress and impact.

In particular, cracking and chipping can be prevented more effectively with a high dielectric breakdown voltage by controlling the content rate of each constituent element in the segregation phases 21, the average particle size of the segregation phases 21, the content rate of the segregation phases 21, or the like within a predetermined range.

Hereinbefore, an embodiment of the present invention is explained, but the present invention is not limited to the above-mentioned embodiment and can be modified variously without departing from the gist of the present invention.

In the present embodiment, for example, the multilayer ceramic capacitor 2 is exemplified as the multilayer ceramic electronic device, but the multilayer ceramic electronic device of the present invention may be, for example, band-pass filters, multilayer three-terminal filters, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

In Experiment 1, capacitor samples according to Examples 1-3 and Comparative Examples 1-5 were manufactured in the following procedure.

Example 1

First, a main component powder (a raw material of a dielectric paste) and a segregation powder were prepared. Specifically, the main component powder was a $(Ca_{0.7}Sr_{0.3})(Zr_{0.96}Ti_{0.04})O_3$ powder produced by a solid phase method. On the other hand, the segregation powder was obtained by mixing a $CaCO_3$ powder, a $MnCO_3$ powder, and a $SiO_2$ powder in wet manner at a predetermined proportion, calcining the mixture, and then pulverizing the mixture with a ball mill. That is, in Example 1, a ternary composite oxide of Ca—Mn—Si—O was used as the segregation powder.

Next, the main component powder, the segregation powder, an organic vehicle, and a sub-component powder ($Al_2O_3$ powder) were kneaded to obtain a dielectric paste. Moreover, a Ni powder and an organic vehicle were kneaded to obtain an internal-electrode paste.

Next, green chips were manufactured by a sheet method using the dielectric paste and the internal-electrode paste mentioned above. Then, the green chips were subjected to a binder removal treatment, a firing treatment, and an annealing treatment to obtain element bodies 4 each having dimensions of L0×W0×T0=3.2 mm×2.5 mm×2.5 mm. In each element body 4, the lamination number of ceramic layers 10 sandwiched by the internal electrode layers 12 was 150, the average thickness of the ceramic layers 10 was 12 μm, and the average thickness of the internal electrode layers 12 was 1.4 μm. Through the above steps, capacitor samples according to Example 1 were obtained.

Example 2

In Example 2, a $SrCO_3$ powder, a $MnCO_3$ powder, and a $SiO_2$ powder were mixed in wet manner at a predetermined proportion, calcined, and then pulverized with a ball mill to obtain a segregation powder. That is, in Example 2, the type of segregation powder was changed from that in Example 1, and a ternary composite oxide of Sr—Mn—Si—O was used as the segregation powder. Capacitor samples according to Example 2 were obtained under the same experimental conditions as in Example 1 except for the above.

Example 3

In Example 3, a $CaCO_3$ powder, a $SrCO_3$ powder, a $MnCO_3$ powder, and a $SiO_2$ powder were mixed in wet manner at a predetermined proportion, calcined, and pulverized with a ball mill to obtain a segregation powder. That is, in Example 3, the type of segregation powder was changed from that in Example 1, and a quaternary composite oxide of Ca—Sr—Mn—Si—O was used as the segregation powder. Capacitor samples according to Example 3 were obtained under the same experimental conditions as in Example 1 except for the above.

Comparative Example 1

In Comparative Example 1, a dielectric paste was prepared without using a segregation powder. That is, the dielectric paste in Comparative Example 1 was prepared by mixing a main component powder consisting of $(Ca_{0.7}Sr_{0.3})(Zr_{0.96}Ti_{0.04})O_3$, a sub-component powder (the same sub-component as in Example 1), and an organic vehicle. Capacitor samples according to Comparative Example 1 were obtained under the same experimental conditions as in Example 1 except for the above.

Comparative Example 2

In Comparative Example 2, a $MnCO_3$ powder was added to a dielectric paste without using a segregation powder. That is, the dielectric paste in Comparative Example 2 was prepared by mixing a main component powder consisting of $(Ca_{0.7}Sr_{0.3})(Zr_{0.96}Ti_{0.04})O_3$, the $MnCO_3$ powder, a sub-component powder (the same sub-component as in Example 1), and an organic vehicle. Capacitor samples according to Comparative Example 2 were obtained under the same experimental conditions as in Example 1 except for the above.

Comparative Example 3

In Comparative Example 3, a $MnCO_3$ powder and a $SiO_2$ powder were added to a dielectric paste without using a segregation powder. That is, the dielectric paste in Comparative Example 3 was prepared by mixing a main component powder consisting of $(Ca_{0.7}Sr_{0.3})(Zr_{0.96}Ti_{0.04})O_3$, the $MnCO_3$ powder, the $SiO_2$ powder, a sub-component powder (the same sub-component as in Example 1), and an organic vehicle. Capacitor samples according to Comparative Example 3 were obtained under the same experimental conditions as in Example 1 except for the above.

Comparative Example 4

In Comparative Example 4, a $CaCO_3$ powder and a $SiO_2$ powder were added to a dielectric paste without using a segregation powder. That is, the dielectric paste in Comparative Example 4 was prepared by mixing a main component powder consisting of $(Ca_{0.7}Sr_{0.3})(Zr_{0.96}Ti_{0.04})O_3$, the $CaCO_3$ powder, the $SiO_2$ powder, a sub-component powder (the same sub-component as in Example 1), and an organic vehicle. Capacitor samples according to Comparative Example 4 were obtained under the same experimental conditions as in Example 1 except for the above.

Comparative Example 5

In Comparative Example 5, a $SrCO_3$ powder and a $SiO_2$ powder were added to a dielectric paste without using a segregation powder. That is, the dielectric paste in Comparative Example 5 was prepared by mixing a main component powder consisting of $(Ca_{0.7}Sr_{0.3})(Zr_{0.96}Ti_{0.04})O_3$, the $SrCO_3$ powder, the $SiO_2$ powder, a sub-component powder (the same sub-component as in Example 1), and an organic vehicle. Capacitor samples according to Comparative Example 5 were obtained under the same experimental conditions as in Example 1 except for the above.

The capacitor samples according to Examples and Comparative Examples manufactured in Experiment 1 were subjected to the following evaluations.

Analysis of Segregation Phases

Segregation phases existing in the ceramic layers were analyzed by STEM-EDX. First, a thin sample was taken from the ceramic layers 10 located near the center of the element body by a micro-sampling method using a focused ion beam (FIB), and the thin sample was processed to have parative Example. In the appearance inspection after the test, the number of samples with cracking or chipping of corners in the element body was counted, and the failure rate (%) was calculated. If the failure rate in Condition 1 was 0%, it was judged as "acceptable". If the failure rate in Condition 2 was 0%, the impact resistance was judged to be "very good". Table 1 shows the test results in each Example and each Comparative Example.

Dielectric Breakdown Voltage

In Experiment 1, the dielectric breakdown voltage of the capacitor samples according to each Example and each Comparative Example was measured. Specifically, the capacitor samples were placed in silicone oil at room temperature, a direct electric current was applied to the capacitor samples at a pressure rise rate of 100 V/see, and a voltage value when the leakage electric current exceeded 200 mA was measured as a dielectric breakdown voltage (V). With respect to the dielectric breakdown voltage, the sample with a dielectric breakdown voltage of 1400 V or more was judged to be "good", and the sample with a dielectric breakdown voltage of 1450 V or more was judged to be "very good". Table 1 shows the evaluation results in each Example and each Comparative Example.

TABLE 1

| Sample No. | Main Phases (Dielectric Particles) Main Component | Segregation Phases | | Impact Resistance Test | | Dielectric Break-down Voltage (V) |
| | | Presence or Absence | Constituent Elements | Con-dition 1 Failure Rate (%) | Con-dition 2 Failure Rate (%) | |
| --- | --- | --- | --- | --- | --- | --- |
| Comp. Ex. 1 | $(Ca_{0.7}\,Sr_{0.3})(Zr_{0.96}\,Ti_{0.04})O_3$ | absent | — | 4 | 6 | 1392 |
| Comp. Ex. 2 | $(Ca_{0.7}\,Sr_{0.3})(Zr_{0.96}\,Ti_{0.04})O_3$ | present | Mn—O | 2 | 4 | 1421 |
| Comp. Ex. 3 | $(Ca_{0.7}\,Sr_{0.3})(Zr_{0.96}\,Ti_{0.04})O_3$ | present | Mn—Si—O | 1 | 3 | 1442 |
| Comp. Ex. 4 | $(Ca_{0.7}\,Sr_{0.3})(Zr_{0.96}\,Ti_{0.04})O_3$ | present | Ca—Si—O | 3 | 6 | 1433 |
| Comp. Ex. 5 | $(Ca_{0.7}\,Sr_{0.3})(Zr_{0.96}\,Ti_{0.04})O_3$ | present | Sr—Si—O | 3 | 5 | 1421 |
| Ex. 1 | $(Ca_{0.7}\,Sr_{0.3})(Zr_{0.96}\,Ti_{0.04})O_3$ | present | Ca—Mn—Si—O | 0 | 1 | 1475 |
| Ex. 2 | $(Ca_{0.7}\,Sr_{0.3})(Zr_{0.96}\,Ti_{0.04})O_3$ | present | Sr—Mn—Si—O | 0 | 1 | 1481 |
| Ex. 3 | $(Ca_{0.7}\,Sr_{0.3})(Zr_{0.96}\,Ti_{0.04})O_3$ | present | Ca—Sr—Mn—Si—O | 0 | 0 | 1493 | a thickness of 100 nm or less. As a result, an analytical sample for cross-sectional observation was obtained. Then, the analytical sample was observed by STEM. At this time, a mapping analysis and a point analysis by EDX were performed to determine constituent elements of segregation phases existing inside the ceramic layers 10. Table 1 shows the measurement results in each Example and each Comparative Example.

Impact Resistance Test

In Experiment 1, an impact resistance test was performed on the fired samples (element body) of each Example and each Comparative Example. Specifically, the fired element bodies were dropped from a predetermined height, and the appearance of the dropped element bodies were inspected using a stereomicroscope. Under Condition 1, the drop height was set to 0.5 m, and the impact resistance test was performed on 100 samples for each example and each comparative example. Under Condition 2, the drop height was set to 2.0 m, and the impact resistance test was performed on 100 samples for each Example and each Com- As shown in Table 1, in Comparative Example 1 (no segregation phases were contained) and in Comparative Examples 2 to 5 (segregations composed of single or binary oxide phases were contained), samples with cracking or chipping formed by dropping from 0.5 m were confirmed, and the impact resistance was insufficient. On the other hand, in Examples 1 to 3, segregation phases 21 each containing Mn, Si, O, and at least one selected from Ca and Sr were confirmed. In these examples, cracking and chipping were not generated by dropping from 0.5 m. This result indicates that the occurrence of cracking and chipping in the element body 4 can be prevented by the inclusion of the segregation phases 21 in the dielectric composition constituting the ceramic layers 10.

Comparing Examples 1 to 3, Example 3 had the best impact resistance. This result indicates that the segregation phases 21 preferably contained both Ca and Sr instead of containing only either of Ca and Sr. In all of Examples 1 to 3, the segregation phases 21 were present in the multiple junctions 22a.

Experiment 2

In Experiment 2, capacitor samples according to Examples 4 to 14 were manufactured by changing the proportion of constituent elements in the segregation phases 21.

Examples 4 to 8

In Examples 4 to 8, the content rate of Mn in the dielectric particles 20 and the segregation phases 21 was changed. The content rate of Mn in the segregation phases 21 was controlled by adjusting the blending ratio of the starting raw materials ($CaCO_3$ powder, $SrCO_3$ powder, $MnCO_3$ powder, and $SiO_2$ powder) in the production of the segregation powder. The content rate of Mn in the dielectric particles 20 was controlled by adjusting the oxygen partial pressure in the firing atmosphere. Capacitor samples according to Examples 4 to 8 were manufactured under the same experimental conditions as in Example 3 of Experiment 1 except for the above. The content rate of Mn in each of Examples 4 to 8 was measured using STEM-EDX, and the capacitor samples according to Examples 4 to 8 were subjected to the same evaluations as in Experiment 1. Table 2 shows the evaluation results of Examples 4 to 8.

Examples 9 to 11

In Examples 9 to 11, the total content rate of Ca and Sr in the segregation phases 21 was changed. The total content rate of Ca and Sr was controlled by adjusting the blending ratio of the starting raw materials ($CaCO_3$ powder, $SrCO_3$ powder, $MnCO_3$ powder, and $SiO_2$ powder) in the production of the segregation powder. Capacitor samples according to Examples 9 to 11 were manufactured under the same experimental conditions as in Example 3 of Experiment 1 except for the above. The total content rate of Ca and Sr in each of Examples 9 to 11 was measured using STEM-EDX, and the capacitor samples according to Examples 9 to 11 were subjected to the same evaluations as in Experiment 1. Table 3 shows the evaluation results of Examples 9 to 11.

Examples 12 to 14

In Examples 12 to 14, the content rate of Si in the dielectric particles 20 was changed. The content rate of Si was controlled by adjusting the blending ratio of the starting raw materials ($CaCO_3$ powder, $SrCO_3$ powder, $MnCO_3$ powder, and $SiO_2$ powder) in the production of the segregation powder. Capacitor samples according to Examples 12 to 14 were manufactured under the same experimental conditions as in Example 3 of Experiment 1 except for the above. The total content rate of Si in each of Examples 12 to 14 was measured using STEM-EDX, and the capacitor samples according to Examples 12 to 14 were subjected to the same evaluations as in Experiment 1. Table 4 shows the evaluation results of Examples 12 to 14.

TABLE 2

| | Main Phases (Dielectric Particles) | | Segregation Phases | | Impact Resistance Test | | |
| | | | | | | | |
| Sample No. | Main Component | Content Rate of Mn (mol %) | Constituent Elements | Content Rate of Mn (mol %) | Condition 1 Failure Rate (%) | Condition 2 Failure Rate (%) | Dielectric Breakdown Voltage (V) |
|---|---|---|---|---|---|---|---|
| Ex. 4 | $(Ca_{0.7} Sr_{0.3})(Zr_{0.96} Ti_{0.04})O_3$ | 0.7 | Ca—Sr—Mn—Si—O | 3.1 | 0 | 1 | 1470 |
| Ex. 5 | $(Ca_{0.7} Sr_{0.3})(Zr_{0.96} Ti_{0.04})O_3$ | 0.8 | Ca—Sr—Mn—Si—O | 5.1 | 0 | 0 | 1479 |
| Ex. 6 | $(Ca_{0.7} Sr_{0.3})(Zr_{0.96} Ti_{0.04})O_3$ | 0.2 | Ca—Sr—Mn—Si—O | 7.9 | 0 | 0 | 1493 |
| Ex. 7 | $(Ca_{0.7} Sr_{0.3})(Zr_{0.96} Ti_{0.04})O_3$ | 1.7 | Ca—Sr—Mn—Si—O | 5.5 | 0 | 0 | 1487 |
| Ex. 8 | $(Ca_{0.7} Sr_{0.3})(Zr_{0.96} Ti_{0.04})O_3$ | 2.9 | Ca—Sr—Mn—Si—O | 7.1 | 0 | 0 | 1437 |

TABLE 3

| | Segregation Phases | | Impact Resistance Test | | Dielectric |
| Sample No. | Constituent Elements | Total Content Rate of Ca and Sr (mol %) | Condition 1 Failure Rate (%) | Condition 2 Failure Rate (%) | Breakdown Voltage (V) |
|---|---|---|---|---|---|
| Ex. 9 | Ca—Sr—Mn—Si—O | 58 | 0 | 1 | 1493 |
| Ex. 10 | Ca—Sr—Mn—Si—O | 61 | 0 | 0 | 1484 |
| Ex. 11 | Ca—Sr—Mn—Si—O | 67 | 0 | 0 | 1471 |

TABLE 4

| Sample No. | Segregation Phases | | Impact Resistance Test | | Dielectric |
| | Constituent Elements | Content Rate of Si (mol %) | Condition 1 Failure Rate (%) | Condition 2 Failure Rate (%) | Break-down Voltage (V) |
|---|---|---|---|---|---|
| Ex 12 | Ca—Sr—Mn—Si—O | 19 | 0 | 1 | 1470 |
| Ex 13 | Ca—Sr—Mn—Si—O | 23 | 0 | 0 | 1497 |
| Ex 14 | Ca—Sr—Mn—Si—O | 31 | 0 | 0 | 1493 |

The evaluation results of Examples 4 to 8 shown in Table 2 indicate that when the content rate of Mn in the segregation phases 21 was 5 mol % or more, the impact resistance was very good, and cracking and chipping were more effectively prevented. Moreover, the evaluation results of Examples 4 to 8 indicate that when the content rate of Mn in the dielectric particles 20 was 2 mol % or less, the dielectric breakdown voltage was further improved.

The evaluation results of Examples 9 to 11 shown in Table 3 indicate that when the total content rate of Ca and Sr in the segregation phases 21 was 60 mol % or more, the impact resistance was very good, and cracking and chipping were more effectively prevented.

The evaluation results of Examples 12 to 14 shown in Table 4 indicate that when the content rate of Si in the segregation phases 21 was 20 mol % or more, the impact resistance was very good, and cracking and chipping were more effectively prevented.

Experiment 3

In Experiment 3, capacitor samples according to Examples 15 to 19 with different content rates of the segregation phases 21 were manufactured. The content rate of the segregation phases 21 was controlled by the blending ratio of the segregation powder in the dielectric paste. Moreover, in Experiment 3, capacitor samples according to Examples 20 to 24 with different average particle sizes of the segregation phases 21 were manufactured. The average particle size of the segregation phases 21 was controlled by the pulverization conditions in the pulverization of the segregation powder with a ball mill after the calcination. The content rate of the segregation phases 21 was calculated by determining the segregation phases 21 contained in a cross section of 10 $\mu m^2$ in total (a cross section of the ceramic layers 10) using STEM-EDX. The average particle size of the segregation phases 21 was calculated by measuring the circle equivalent diameters of 20 segregation phases 21.

Experimental conditions other than the above in Experiment 3 were the same as those of Example 3 of Experiment 1. Table 5 shows the evaluation results of Examples 15 to 19. Table 6 shows the evaluation results of Examples 20 to 24.

TABLE 5

| Sample No. | Segregation Phases | | Impact Resistance Test | | Dielectric |
| | Constituent Elements | Content Rate of Segregation Phases (pieces/$\mu m^2$) | Condition 1 Failure Rate (%) | Condition 2 Failure Rate (%) | Break-down Voltage (V) |
|---|---|---|---|---|---|
| Ex. 15 | Ca—Sr—Mn—Si—O | 0.02 | 0 | 1 | 1466 |
| Ex. 16 | Ca—Sr—Mn—Si—O | 0.06 | 0 | 0 | 1493 |
| Ex. 17 | Ca—Sr—Mn—Si—O | 0.16 | 0 | 0 | 1493 |
| Ex. 18 | Ca—Sr—Mn—Si—O | 0.48 | 0 | 0 | 1465 |
| Ex. 19 | Ca—Sr—Mn—Si—O | 0.53 | 0 | 0 | 1433 |

TABLE 6

| Sample No. | Segregation Phases | | Impact Resistance Test | | Dielectric |
| | Constituent Elements | Average Particle Size ($\mu m$) | Condition 1 Failure Rate (%) | Condition 2 Failure Rate (%) | Break-down Voltage (V) |
|---|---|---|---|---|---|
| Ex. 20 | Ca—Sr—Mn—Si—O | 0.04 | 0 | 1 | 1479 |
| Ex. 21 | Ca—Sr—Mn—Si—O | 0.08 | 0 | 0 | 1479 |
| Ex. 22 | Ca—Sr—Mn—Si—O | 0.28 | 0 | 0 | 1493 |
| Ex. 23 | Ca—Sr—Mn—Si—O | 0.82 | 0 | 0 | 1496 |
| Ex. 24 | Ca—Sr—Mn—Si—O | 1.39 | 0 | 0 | 1414 |

The evaluation results of Examples 15 to 19 shown in Table 5 indicate that when the content rate of the segregation phases 21 was in the range of 0.05 pieces/$\mu m^2$ or more and 0.50 pieces/$\mu m^2$ or less, cracking and chipping were more effectively prevented with a high dielectric breakdown voltage.

The evaluation results of Examples 20 to 24 shown in Table 6 indicate that when the average particle size of the segregation phases 21 was in the range of 0.05 $\mu m$ or more and 1.00 $\mu m$ or less, cracking and chipping were more effectively prevented with a high dielectric breakdown voltage.

DESCRIPTION OF THE REFERENCE NUMERICAL

2 . . . multilayer ceramic capacitor
   4 . . . element body
      4a . . . end surface
      4b . . . side surface
         10 . . . ceramic layer
         12 . . . internal electrode layer
            20 . . . dielectric particle
            21 . . . segregation phase
            22 . . . grain boundary
            22a . . . multiple junctions
            22b . . . two-particle grain boundary
   6 . . . external electrode

What is claimed is:

1. A dielectric composition comprising:
dielectric particles each including Ca and/or Sr;
segregation phases each including Mn, Si, O, and at least one selected from Ca and Sr.

2. The dielectric composition according to claim 1, wherein
each of the dielectric particles includes a perovskite compound represented by $ABO_3$,
an A-site of the perovskite compound includes Ca and/or Sr,
a B-site of the perovskite compound includes Zr and/or Ti,
a total molar ratio of Ca and Sr to 1 mol of the A-site is 0.8 or more, and
a molar ratio of Zr to 1 mol of the B-site is 0.8 or more.

3. The dielectric composition according to claim 1, wherein
the dielectric composition comprises at least one element selected from the group consisting of Ca, Sr, Zr, Mn, Si, Al, Ti, and Hf,
a content rate of Mn in the segregation phases is 5 mol % or more provided that a total content of the at least one element in the segregation phases is 100 mol %, and
a content rate of Mn in the dielectric particles is 2 mol % or less provided that a total content of the at least one element in the dielectric particles is 100 mol %.

4. The dielectric composition according to claim 1, wherein
the dielectric composition comprises at least one element selected from the group consisting of Ca, Sr, Zr, Mn, Si, Al, Ti, and Hf, and
a total content rate of Ca and Sr in the segregation phases is 60 mol % or more provided that a total content of the at least one element in the segregation phases is 100 mol %.

5. The dielectric composition according to claim 1, wherein the dielectric composition comprises at least one element selected from the group consisting of Ca, Sr, Zr, Mn, Si, Al, Ti, and Hf,
a content rate of Si in the segregation phases is 20 mol % or more provided that a total content of the at least one element in the segregation phases is 100 mol %.

6. A dielectric composition comprising:
dielectric particles each including Ca and/or Sr;
segregation phases each including Mn, Si, O, and at least one selected from Ca and Sr,
wherein a content rate of the segregation phases is 0.05 pieces/$\mu m^2$ or more and 0.5 pieces/$\mu m^2$ or less.

7. A dielectric composition comprising:
dielectric particles each including Ca and/or Sr;
segregation phases each including Mn, Si, O, and at least one selected from Ca and Sr,
wherein an average particle size of the segregation phases is 0.05 $\mu m$ or more and 1.00 $\mu m$ or less.

8. A multilayer ceramic electronic device comprising the dielectric composition according to claim 1.

9. The dielectric composition according to claim 6, wherein
each of the dielectric particles includes a perovskite compound represented by $ABO_3$,
an A-site of the perovskite compound includes Ca and/or Sr,
a B-site of the perovskite compound includes Zr and/or Ti,
a total molar ratio of Ca and Sr to 1 mol of the A-site is 0.8 or more, and
a molar ratio of Zr to 1 mol of the B-site is 0.8 or more.

10. The dielectric composition according to claim 6, wherein
the dielectric composition comprises at least one element selected from the group consisting of Ca, Sr, Zr, Mn, Si, Al, Ti, and Hf,
a content rate of Mn in the segregation phases is 5 mol % or more provided that a total content of the at least one element in the segregation phases is 100 mol %, and
a content rate of Mn in the dielectric particles is 2 mol % or less provided that a total content of the at least one element in the dielectric particles is 100 mol %.

11. The dielectric composition according to claim 6, wherein
the dielectric composition comprises at least one element selected from the group consisting of Ca, Sr, Zr, Mn, Si, Al, Ti, and Hf, and
a total content rate of Ca and Sr in the segregation phases is 60 mol % or more provided that a total content of the at least one element in the segregation phases is 100 mol %.

12. The dielectric composition according to claim 6, wherein
the dielectric composition comprises at least one element selected from the group consisting of Ca, Sr, Zr, Mn, Si, Al, Ti, and Hf,
a content rate of Si in the segregation phases is 20 mol % or more provided that a total content of the at least one element in the segregation phases is 100 mol %.

13. A multilayer ceramic electronic device comprising the dielectric composition according to claim 6.

14. The dielectric composition according to claim 7, wherein
each of the dielectric particles includes a perovskite compound represented by $ABO_3$,
an A-site of the perovskite compound includes Ca and/or Sr,
a B-site of the perovskite compound includes Zr and/or Ti, a total molar ratio of Ca and Sr to 1 mol of the A-site is 0.8 or more, and a molar ratio of Zr to 1 mol of the B-site is 0.8 or more.

15. The dielectric composition according to claim 7, wherein the dielectric composition comprises at least one element selected from the group consisting of Ca, Sr, Zr, Mn, Si, Al, Ti, and Hf, a content rate of Mn in the segregation phases is 5 mol % or more provided that a total content of the at least one element in the segregation phases is 100 mol %, and a content rate of Mn in the dielectric particles is 2 mol % or less provided that a total content of the at least one element in the dielectric particles is 100 mol %.

16. The dielectric composition according to claim 7, wherein the dielectric composition comprises at least one element selected from the group consisting of Ca, Sr, Zr, Mn, Si, Al, Ti, and Hf, and a total content rate of Ca and Sr in the segregation phases is 60 mol % or more provided that a total content of the at least one element in the segregation phases is 100 mol %.

17. The dielectric composition according to claim 7, wherein the dielectric composition comprises at least one element selected from the group consisting of Ca, Sr, Zr, Mn, Si, Al, Ti, and Hf, a content rate of Si in the segregation phases is 20 mol % or more provided that a total content of the at least one element in the segregation phases is 100 mol %.

18. A multilayer ceramic electronic device comprising the dielectric composition according to claim 7.

* * * * *